US008812458B2

(12) United States Patent
Moulckers et al.

(10) Patent No.: US 8,812,458 B2
(45) Date of Patent: *Aug. 19, 2014

(54) ADAPTIVE METHODOLOGY FOR UPDATING SOLUTION BUILDING BLOCK ARCHITECTURES AND ASSOCIATED TOOLING

(75) Inventors: Ingrid M. Moulckers, Austin, TX (US); Sandra K. Johnson, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 935 days.

This patent is subject to a terminal disclaimer.

(21) Appl. No.: 12/112,024

(22) Filed: Apr. 30, 2008

(65) Prior Publication Data

US 2009/0276444 A1 Nov. 5, 2009

(51) Int. Cl.
*G06F 7/00* (2006.01)

(52) U.S. Cl.
USPC .......................................................... 707/688

(58) Field of Classification Search
CPC .......... G06F 8/433; G06F 8/48; G06F 11/368
USPC .................... 707/803, 688, 690, 808, 999.101
See application file for complete search history.

(56) References Cited

U.S. PATENT DOCUMENTS

| | | | | |
|---|---|---|---|---|
| 6,341,291 | B1 * | 1/2002 | Bentley et al. ........................ | 1/1 |
| 7,188,158 | B1 * | 3/2007 | Stanton et al. ................ | 709/220 |
| 7,315,826 | B1 * | 1/2008 | Guheen et al. ..................... | 705/7 |
| 7,483,970 | B2 * | 1/2009 | Anuszczyk et al. .......... | 709/224 |
| 8,126,768 | B2 * | 2/2012 | Mehrotra et al. ............ | 705/7.36 |
| 2003/0217171 | A1 * | 11/2003 | Von Stuermer et al. ...... | 709/231 |
| 2004/0059611 | A1 | 3/2004 | Kananghinis et al. | |
| 2004/0268327 | A1 | 12/2004 | Burger | |
| 2005/0033588 | A1 * | 2/2005 | Ruiz et al. .......................... | 705/1 |
| 2005/0114152 | A1 | 5/2005 | Lopez et al. | |
| 2006/0117012 | A1 | 6/2006 | Rizzolo et al. | |
| 2006/0168557 | A1 | 7/2006 | Agrawal et al. | |
| 2006/0230389 | A1 | 10/2006 | Moulckers et al. | |

(Continued)

OTHER PUBLICATIONS

An architecture-Based Approach to Self-Adaptive Software; Peyman Oreizy, Michael M. Gorlick, Richard N. Taylor, Dennis Heimbigner, Gregory Johnson, Nenad Medvidovic, Alex Quilici, David S. Rosenblum, and Alexander L Wolf; IEEE 1999, (herein after Peyman).*

(Continued)

*Primary Examiner* — Mohammed R Uddin
(74) *Attorney, Agent, or Firm* — John D. Flynn; Gregory K. Goshorn; Greg Goshorn, P.C.

(57) ABSTRACT

Provided is a method for the adaptive updating of building block architectures and designs in the event of a change to a component of the building block architecture. When a specific component of the architecture, or SBB, is replaced or modified, the metadata associated with the new or modified component is placed in a building block repository. The system captures or recognizes the event and automatically makes updates to dependent components of the specific component. Such updates may include, but are not limited to, a substitution or replacement of one component with another, generally if the replacement component is a better fit in the solution architecture than the original component. A new or updated system architecture is generated to reflect the replaced and/or modified components and the associated metadata. In the alternative, the system notifies an administrator to make specific changes in components rather than implementing the changes automatically.

20 Claims, 6 Drawing Sheets

(56) References Cited

U.S. PATENT DOCUMENTS

| | | |
|---|---|---|
| 2006/0282831 A1 | 12/2006 | Toeroe |
| 2007/0006222 A1* | 1/2007 | Maier et al. ............... 717/174 |
| 2009/0012832 A1* | 1/2009 | Greenstein ................. 705/8 |
| 2009/0083274 A1* | 3/2009 | Roden ....................... 707/10 |

OTHER PUBLICATIONS

Laveris et al., "building Enterprise Architectures with TOGAF," Telelogic White Paper, Jun. 23, 2005, pp. 1-36.

"Designing and Implementing an Effective Software Updating Solution," Macrovision Update Service, Nov. 2004, pp. 1-14.

* cited by examiner

ADAPTIVE METHODOLOGY FOR UPDATING SOLUTION BUILDING BLOCK ARCHITECTURES AND ASSOCIATED TOOLING

BACKGROUND

1. Technical Field

The claimed subject matter relates generally to solution building blocks (SBBs) architectures and, more specifically, to a method of providing automatic updates to a SBB architecture solution in the event of a change to one or more SBB components.

2. Description of the Related Art

International Business Machines Corp. (IBM) of Armonk, N.Y. has been at the forefront of new paradigms in business computing. For decades, the typical paradigm for business computing is that custom business applications had to be specifically designed and built for every business need. Of course, most custom business applications benefited from commonly-available, standardized applications. For example, a business that requires a database management system (DBMS) has several vendors from which to choose and each choice typically provides many of the same necessary features and interfaces to an application developer. However, a DBMS is only one of a multitude of possible components that may be required to implement a business solution.

There are several approaches to the development of a business software solution for a particular business. One approach focuses on specific components, or solution building blocks (SBBs), designed for an information technology (IT) environment. SBBs are preconfigured bundles of interoperable hardware and middleware that enable a business or infrastructure solution to be implemented. Examples of middleware include, but are not limited to, web servers, application servers and database servers. Examples of hardware include, but are not limited to, servers, data storage and associated system management software. In other words, SBBs are reusable assets that can be deployed in many different engagements for a diverse set of business and infrastructure solution offerings.

Typically, SBBs require additional integration to develop and deploy a complete solution. There exist architectures and associated tools designed to enable a developer to quickly assemble middleware and hardware components into SBBs. However, these existing technologies and methodologies do not provide adaptive functionality to enable automatic updates of the individual components of an SBB in the event of changes to the architecture or design of a targeted component.

Two terms that may be useful to clarify are the terms "application" and "solution." In some cases, an application solves several problems and as a result may be considered a solution. However, usually the term "solution" refers to an application because a solution solves a target set of problems. A solution is usually broader than an application because it resolves or addresses horizontal as well as vertical business problems. Solutions are typically delivered for the purpose of running a business end-to-end and not just focused on a portion (or application of the business). An application is applied to solve a set of problems for a business and might be applied to solve another set of problems of the same kind for another customer.

SUMMARY OF THE CLAIMED SUBJECT MATTER

Provided is a method for the adaptive updating of building block architectures and associated tooling, such as a solution building block (SBB) architecture, in the event of a change to either a component of the building block architecture or a change in the solution architecture. The remainder of the Specification focuses primarily on the relationship of the claimed subject matter to SBBs, although it should be understood that the disclosed technology is equally applicable to any building block architecture, many of which should familiar to those with skill in the computing arts.

Typically, an on-demand, custom solution to a user or business's computing needs has a specific architecture and a common metadata definition that defines attributes and dependencies among components. When a specific, or target, component of the architecture, or SBB, is replaced or modified, the metadata associated with the new or modified component is placed in a building block repository. The system then captures or recognizes the event and automatically makes updates to the solution architecture and associated tooling. Such updates may include, but are not limited to, a substitution or replacement of one component with another, generally if the replacement component is a better fit in the solution architecture than the original component. An updated solution architecture also generates changes by replacing and/or modifying components and the associated metadata. In the alternative, the system notifies an administrator to make specific changes to the solution architecture rather than implementing the changes automatically.

By employing the disclosed technology, a user, using a tool, such as Rational Solution Architecture, creates and/or manipulates either an architecture model of the particular components of a business solution. Attributes of individual components allow for the correlation of the components' architecture with metadata relating to the management of the lifecycle of the components. Modifications to dependent components and the architecture model are implemented based upon the changes to the architectural model. In other words, a new or updated solution architecture, which includes the new or updated components as associated by the metadata, is generated. In addition, a modification to the solution architecture may cause one or more components to be updated.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE FIGURES

A better understanding of the claimed subject matter can be obtained when the following detailed description of the disclosed embodiments is considered in conjunction with the following figures.

DETAILED DESCRIPTION OF THE FIGURES

Although described with particular reference to a solution building block (SBB) architecture, the claimed subject matter can be implemented in any information technology (IT) system in which the automatic update and replacement of components, a solution architecture and/or associated tooling is desirable. Those with skill in the computing arts will recognize that the disclosed embodiments have relevance to a wide variety of computing environments in addition to those described below. In addition, the methods of the disclosed technology can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic or semiconductor system, apparatus or device. Memory and recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for updating and modifying a solution architecture. The term "programmed method", as used herein, is defined to mean one or more process steps that are presently performed; or, alternatively, one or more process steps that are enabled to be performed at a future point in time. The term "programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
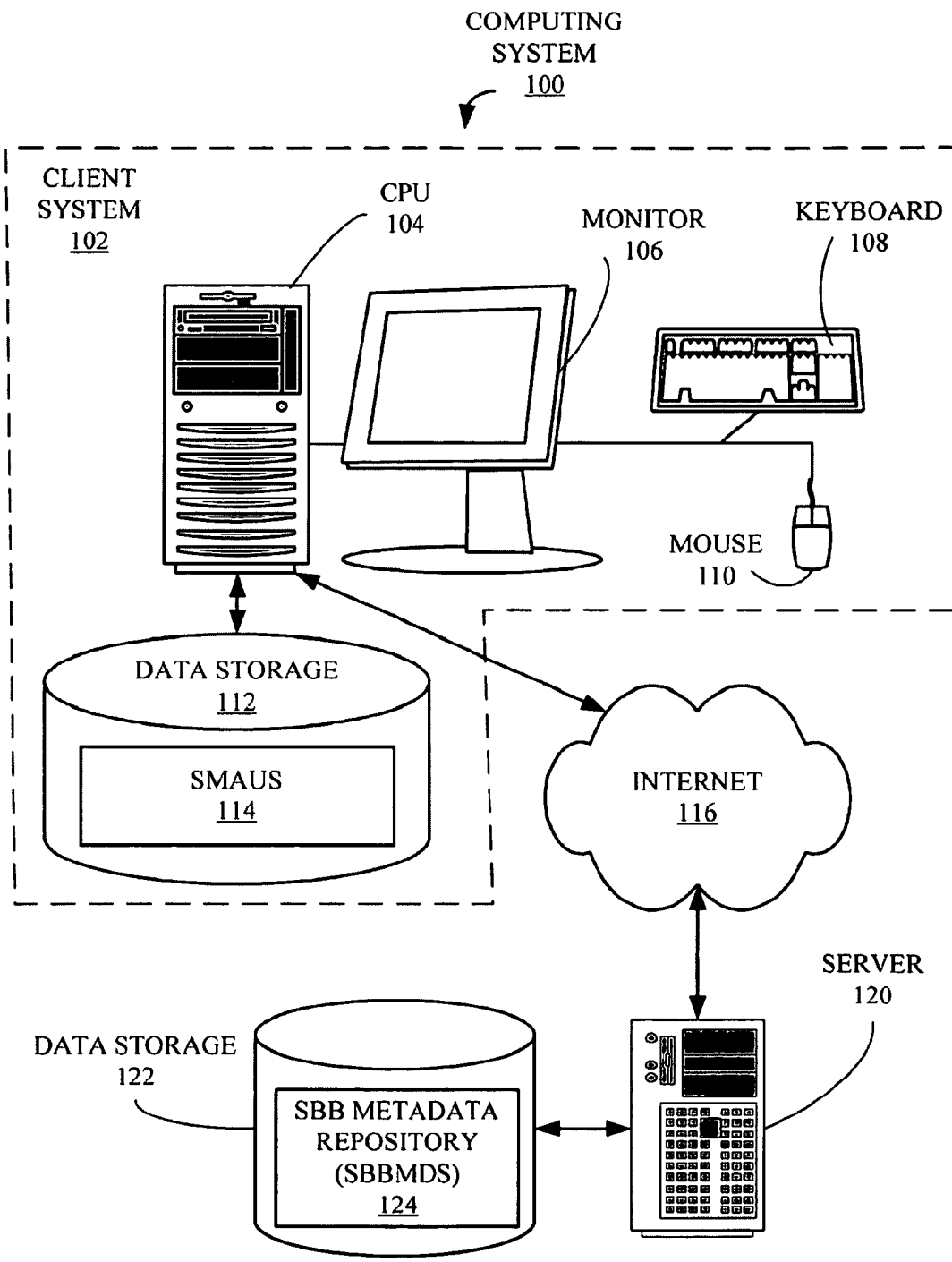
FIG. 1 is a block diagram of one example of a computing system that implements aspects of the claimed subject matter.

Turning now to the figures, FIG. 1 is a block diagram of one example of a computing system architecture 100 that implements aspects of the claimed subject matter. A client system 102 includes a central processing unit (CPU) 104, coupled to a monitor 106, a keyboard 108 and a mouse 110, which together facilitate human interaction with computing system 100 and client system 102. Also included in client system 102 and attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown). Data storage 112 is illustrated storing a component monitoring and update system (SMAUS) 114. SMAUS 114 is described in more detail below in conjunction with FIGS. 2-6.

Client system 102 and CPU 104 are connected to the Internet 120, which is also connected to a server computer 122. Although in this example, CPU 104 and server 122 are communicatively coupled via the Internet 116, they could also be coupled through any number of communication mediums such as, but not limited to, a local area network (LAN) (not shown). Server 120 is coupled to a data storage 122, which may either be incorporated into server 120, i.e. an internal device, or attached externally to server 120 by means of various, commonly available connection devices such as but not limited to, a universal serial bus (USB) port (not shown). It should be noted there are many possible computing system configurations, of which computing system 100 is only one simple example.

Data storage 122 stores a SBB metadata repository (SBBMDR) 124. SBBMDR 124 stores information about individual SBBs that are available for inclusion in a particular business solution and the relationship among the SBBs. In other words, SBBMDR 124 is a library of available SBBs that is maintained for the benefit of developers creating business solutions. Examples of information stored in SBBMDR 124 include what the individual SBBs are and version numbers. Also stored is information relating to how SBBs may be physically and logically arranged architecturally, how each SBB is constructed, the tools necessary to adapt, deploy, reconstruct and so on each, and any additional information necessary to utilize SBBs. The use of SBBS and SBBMDS 124 are described in more detail below in conjunction with FIGS. 2-6.

Figure 2:
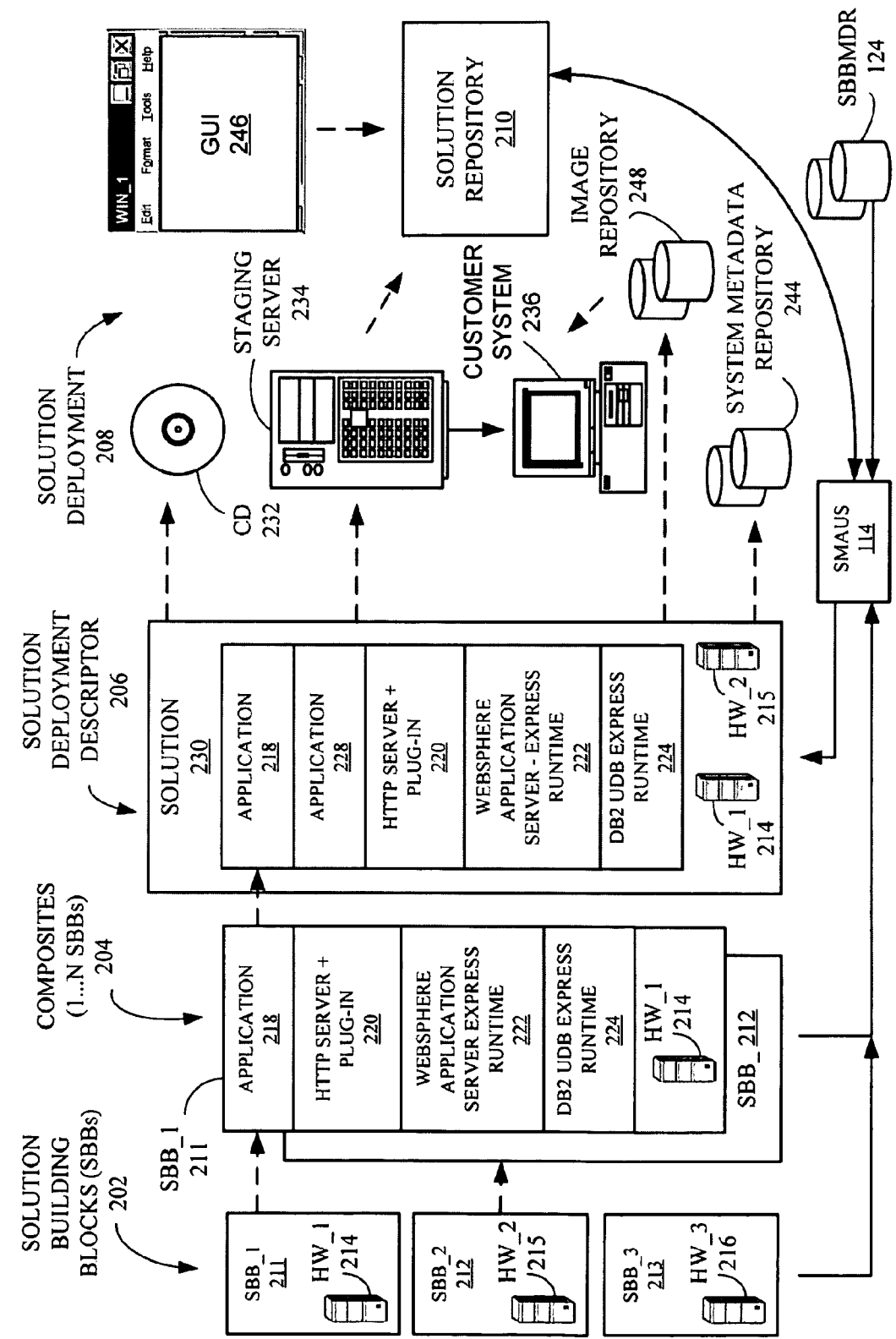
FIG. 2 is a block diagram of a solution development system architecture that employs the claimed subject matter, including a solution monitor and update system (SMAUS), first introduced in conjunction with FIG. 1.

FIG. 2 is a block diagram of solution development system 200 showing some exemplary components and business solution distribution elements. System 200 includes solution building blocks (SBBs) 202, composites (1 . . . N SBBs) 204, a solution deployment descriptor phase 206, a solution deployment phase 208 and a solution repository 210.

SBBs 202 includes several individual SBBs, specifically a SBB_1 211, a SBB_2 212 and a SBB_3 213. In this example, each of SBBs 211-213 include, in addition to middleware described below, a hardware component, or HW_1 214, HW_2 215 and HW_3 216, respectively. As described above in the Description of the Related Art, examples of SBBs 211-213 include middleware such as, but are not limited to, web servers, application servers and database servers. Examples of HW_1 214 include hardware such as, but are not limited to, servers, data storage and associated system management software. In addition, SBBs may be nested, i.e. one SBB may include another SBB.

Each of components 211-214 may be selected for inclusion in a particular solution architecture and represent preconfigured, interoperable software and/or hardware bundles. SBB metatdata repository (SBBMDR) 124 (FIG. 1) stores information about individual SBBs and the relationship among the SBBs. Examples of information stored in SBBMDR 124 include what the individual SBBs 211-213 are and version numbers. Also stored is information relating to how SBBs 211-213 are physically and logically arranged architecturally, how each SBB is constructed, the tools necessary to adapt, deploy, reconstruct and so on each SBB 211-213, and any additional information necessary to utilize SBB 211-213.

SMAUS 114 (FIG. 1) is employed to implement the processes and methods described in more detail below in conjunction with FIGS. 3-6. SMAUS 114 is employed to detect modifications to either SBBs 211-213, composites 204 or a business solution 230. It should be understood that a typical system 200 would typically include more than three SBBs but that for the sake of simplicity, only SBBs 211-213 are illustrated. In this example, SBB_1 211 and SBB_2 212 have been selected for inclusion in composites 204.

SBB_1 211 is illustrated in more detail, showing some examples of possible core components including an application 218, a HTTP server and associated plug-ins 220, a Websphere application server express runtime module 222, a DB2 universal database (UDB) express runtime module 224 and associated hardware HW_1 214 for executing components 218, 220, 222 and 224. Although not illustrated, SBB_2 212 also includes core components.

Solution deployment descriptor 206 represents business solution 230. Included in solution 230 are the components of SBB_1 211, which was selected for composites 204, including application 218, components 220, 222 and 224, and HW_1 214. Also included in solution 230 are any components from SBB_2 212 minus any unnecessary duplicate components. Components from SBB_2 212 include an application 228 and HW_2 215. In this example, components such as components 220, 222 and 224 are part of both SBB_1 211 and SBB_2 212 and therefore are not duplicated in solution 230.

Solution deployment 208 illustrates some methods of distributing solution 230 to an eventual client or customer. Examples of such distribution techniques include, but are not limited to, a compact disk (CD) 232, which is mailed or otherwise delivered to the customer for installation on a customer system 236; and a staging server 234, from which customer system 236 can download solution 230. Those with skill in the computing arts should recognize that there are many possible delivery options in addition to CD 232 and staging server 234. Further, there are many possible customer configurations, of which customer system 236 is only one simple example.

In addition to a delivery to customer system 234, information related to solution 230 is stored as an architectural design in solution repository 210. Data stored in solution repository 210 is accessed and manipulated by an administrator using a graphical user interface 246. For the sale of efficiency, various screens of GUI 246 are stored in an image repository 248. In addition, images stored in image repository 248 may be accessed by administrators via customer system 236.

A system metadata repository 244 stores metadata for the system architecture stored in solution repository 210 as well as for each component included in business solution 230 and represented by the system architecture. Like SBBMDR 124, system repository 244 stores the metadata associated with any SBB that has been incorporated into solution 230 and stored in solution repository 210.

Figure 3:
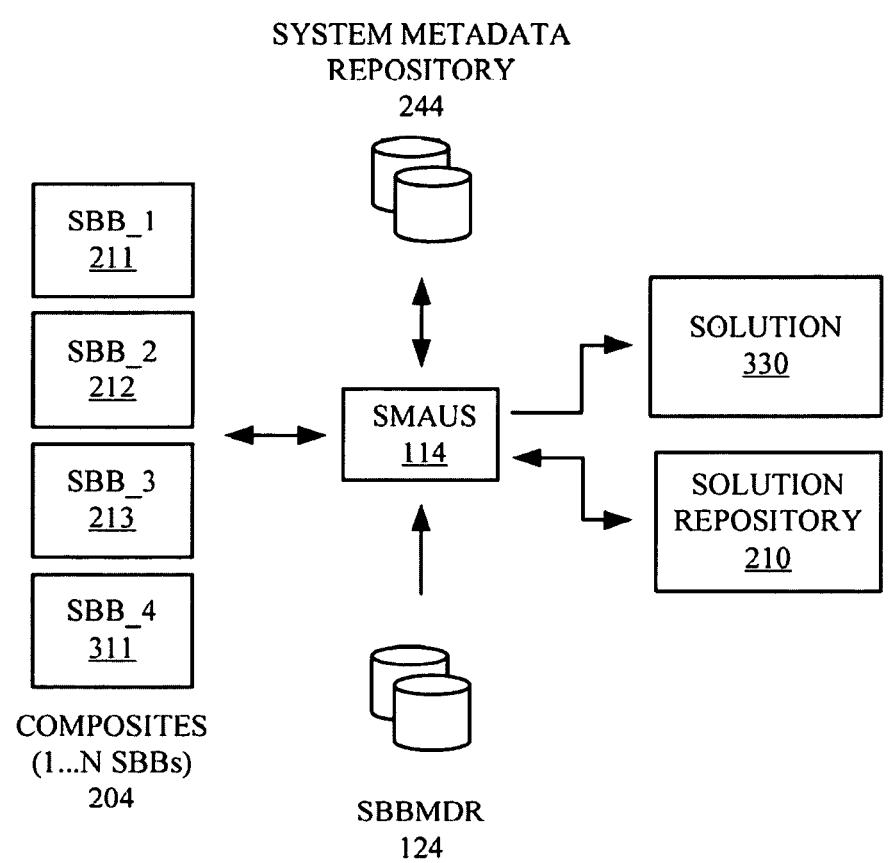
FIG. 3 is a block diagram of various assets, or components, employed in the claimed subject matter and some of the relationships among the components.

FIG. 3 is a block diagram of SMAUS 114 of FIGS. 1 and 2 showing the relationships among various additional components. SBB_1 211, SBB_2 212, SBB_3 213 (FIG. 2), SBBMDR 124 (FIGS. 1 and 2), system metadata repository 244 and solution repository 210 (FIG. 2) are shown. In addition, a SBB_4 311 and a solution 330 are illustrated. SBB_4 311 and solution 330 are explained in more detail below in conjunction with FIG. 4.

As explained above, information, or metadata, about SBBs 211-213 and 311 is stored in SBBMDR 124 because they are components available for incorporation into a solution such as solution 230 (FIG. 2) and solution 330. Further, metadata associated with SBB_1 211 and SBB_2 212 is stored in system metadata repository 244 because SBB_1 211 SBB_2 212 are incorporated into solution 230 and solution repository 210 as illustrated above in FIG. 2.

In this example, SMAUS 114 retrieves information from SBBMDR 124, composites 204, solution repository 210 and system metadata repository 244. By comparing information, SMAUS 114 determines whether or not solution 230 should be updated. If so, solution 330 is generated and any or all of composites 204, system metadata repository 244 and solution repository 210 are updated. Processes associated with SMAUS 114 are described in more detail below in conjunction with FIGS. 4-6.

Figure 4:
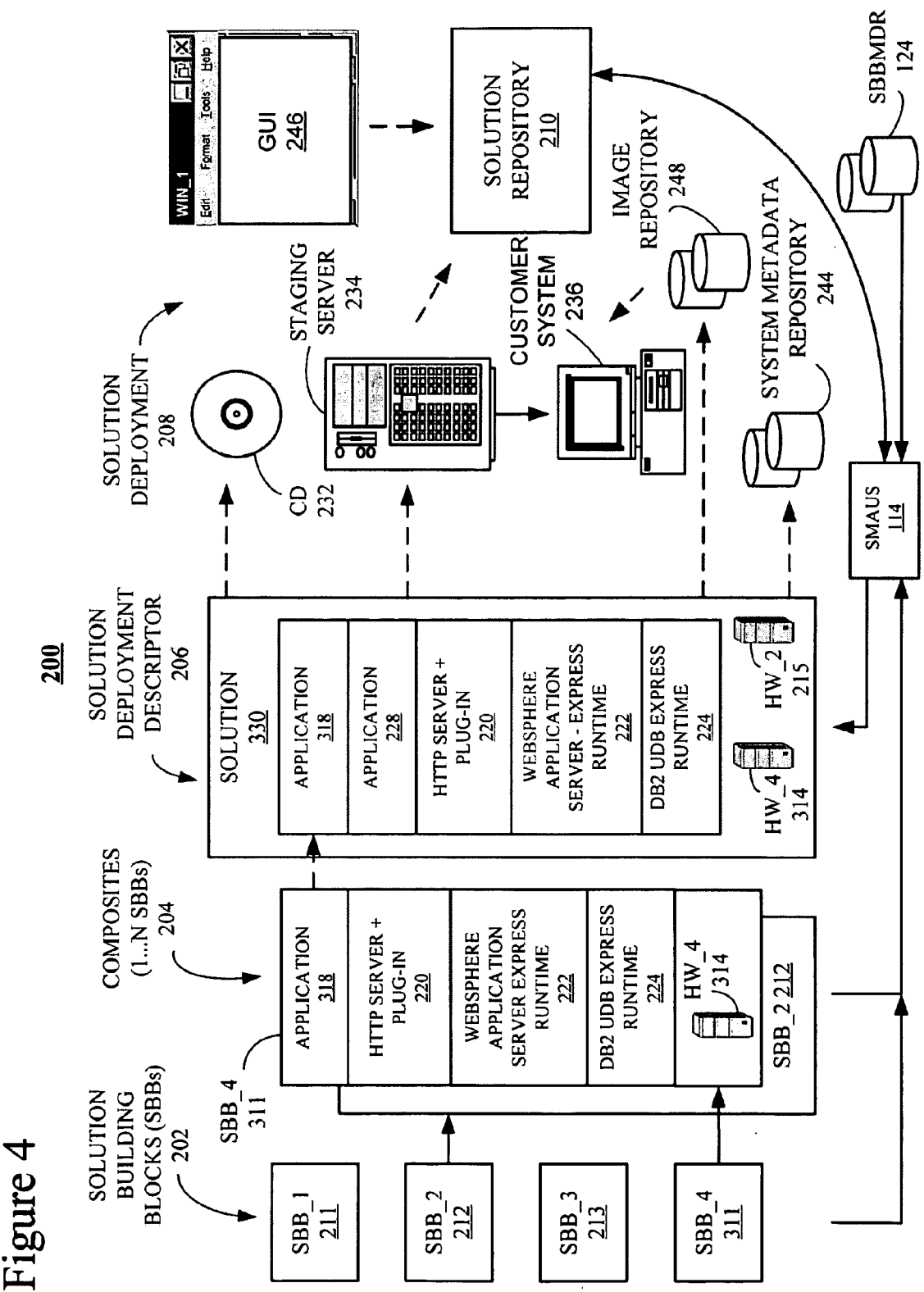
FIG. 4 is a block diagram showing the update of a particular solution architecture as implemented by the SMAUS of FIGS. 1 and 2.

FIG. 4 is a block diagram showing the update of a particular solution as implemented by the SMAUS of FIGS. 1-3. FIG. 4 includes most of the components and stages described above in conjunction with FIGS. 2 and 3. Components and stages duplicated from FIGS. 2 and/or 3 are not described again in conjunction with FIG. 4. However, SBB_1 211 (FIG. 1) has been replaced by SBB_4 311 and HW_1 214, a hardware component of SBB_1 211, has been replaced by hardware component HW_4 314. In this example, the substitution of SBB_1 211 by SBB_4 311 represents an upgrade of SBB_1 211 that also requires an upgrade from HW_1 214 to HW_4 314.

The upgrade is propagated through composites 204, solution deployment descriptor 206, solution deployment 208 and solution repository 210 by SMAUS 114. In addition, system metadata repository 244 is updated to reflect the modifications to the system architecture. The detection that the upgrade is available and the initiation of the upgrade are executed by SMAUS 114. Processes associated with the detection and upgrade are executed by SMAUS 114 and described below in conjunction with FIGS. 5 and 6.

In addition to the upgrade form HW_1 214 to HW_4 314, the upgrade from SBB_1 211 to SBB_4 314 involves an upgrade from application 218 to application 318, which shows up as part of SBB_4 311 in composites 204. In this example, the upgrade does not necessitate changing components 220, 222 or 224 although other modifications to the system could involve changes.

Figure 5:
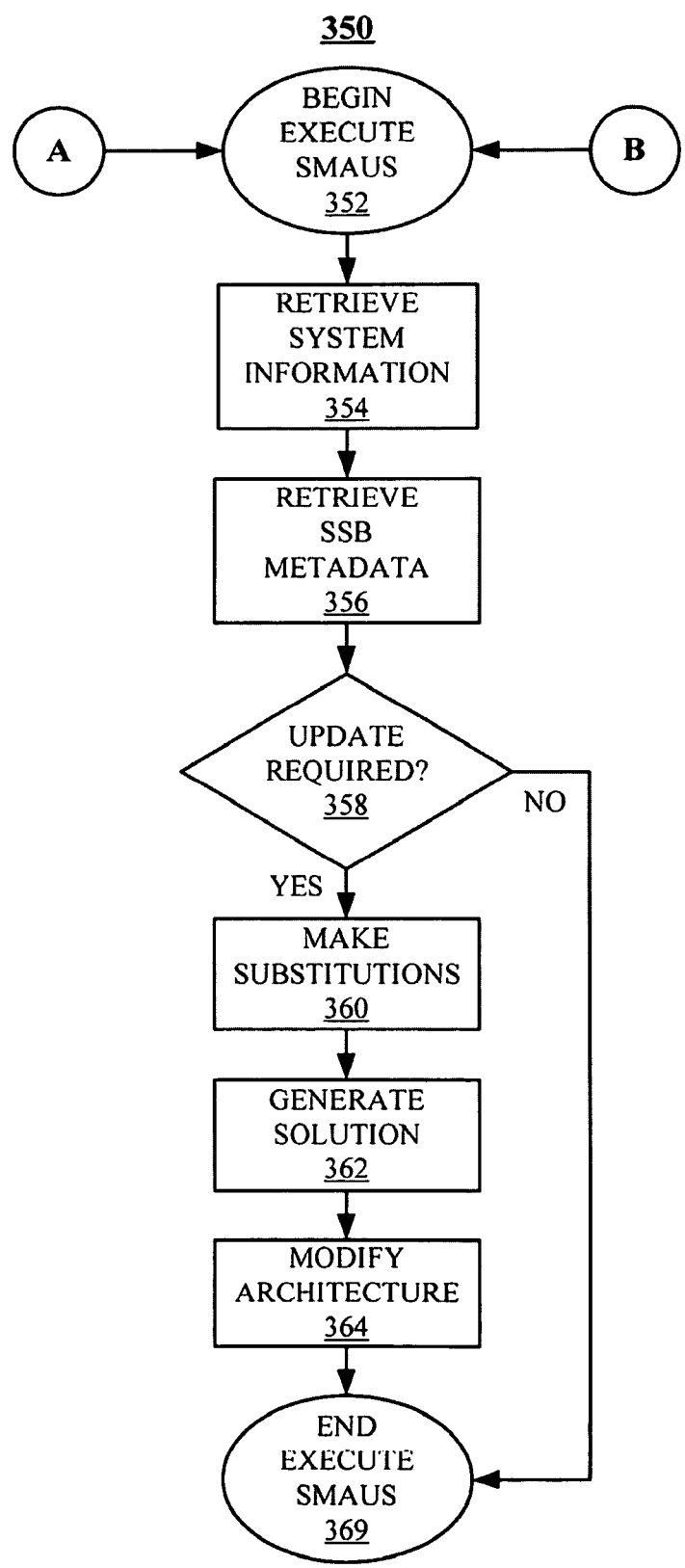
FIG. 5 is a flowchart of an Execute SMAUS process that implements the claimed subject matter.

FIG. 5 is a flowchart of an Execute SMAUS process 350 that implements the claimed subject matter. In the description below, the execution of process 350 is occurring after system 200 is configured as described in FIG. 2 and before as described in FIG. 4. In other words, process 350 is described as implementing the changes in the solution architecture from those describe in FIG. 2 to those in FIG. 4. Process 350 is stored in data storage 112 (FIG. 1) and executed on CPU 104 (FIG. 1) of client system 102 (FIG. 1).

It should be noted that process 350 may be initiated in a number of ways, although for the sake of simplicity only two (2) are shown, i.e. an initiation event A and an initiation event B. In this example, event A represents a periodic check of the system, initiated either by a system administrator or automatically generated by a system timer set to a configurable parameter. Event B represents a modification to the system architecture as represented in solution repository 210 (FIGS. 1 and 3). The particular manner of initiation is not specified in this example but could be the result of event A, event B or some other event.

Process 350 starts in a "Begin Execute SMAUS" block 352 and proceeds immediately to a "Retrieve System Information" block 354. During block 354, process 350 retrieves metadata from SBBMDR 124 and system metadata repository 244 (FIGS. 2 and 4), information about particular solutions from solution repository 210 and information about selected SBBs from composites 204. As explained above in conjunction with FIG. 2, repository 244 stores metadata associated with software and hardware components currently installed in solution repository 210 (FIGS. 2 and 4) as part of the business solution 230 (FIGS. 2 and 4). During a "Retrieve SBB Metadata" block 356, process 350 retrieves metadata associated with SBB building blocks 202 (FIGS. 2 and 4), stored in SBB metadata repository 245 (FIGS. 2 and 4).

During an "Update Needed?" block 384, process 350 determines whether or not a new solution, architecture or composite needs to be generated. This determination is based upon changes to particular components that indicate the component needs to be updated, new components selected for composite 204 or changes to the system architecture as represented by solution repository 210. If an update is needed to, process 350 proceeds to a "Substitute Components" block 388, which is explained in more detail below in conjunction with FIG. 6.

During a "Generate Solutions" block 360, process 350 takes the results generated during block 360 and, if necessary, generates a new solution. In this example, solution 230 has been replaced by solution 330 because of an update to SBB_1 211 that resulted in the creation of SBB_4 311. Once a new solution such as solution 230 has been generated during block 363, process 350 proceeds to a "Modify Architecture" block 364 during which process 350, if necessary, updates the solution architecture as stored in solution repository.

Typically, a change in a component, such as replacing SBB_1 211 with SBB_4 311 would necessitate the generation of a new solution 330 but would not necessarily necessitate an update to solution repository 210 if the update required during block 358 was triggered by a modification to the system architecture rather than the addition of a new or modified component. Of course, solution repository 210 and the solution architecture would still need to be updated in the event a change in the solution architecture created a need to modify components other than ones specifically targeted during the initial modification.

Finally, once the modified architecture has been implemented during block 364, or, if during block 360, process 350 has determined that an update is not necessary, control proceeds to an "End Execute SMAUS" block 369 in which process 350 is complete. It should be understood, that the example described above is only one scenario in which SMAUS 114 executed to update architecture 200. Those with skill in the computing arts should appreciate that there are many other possible scenarios.

Figure 6:
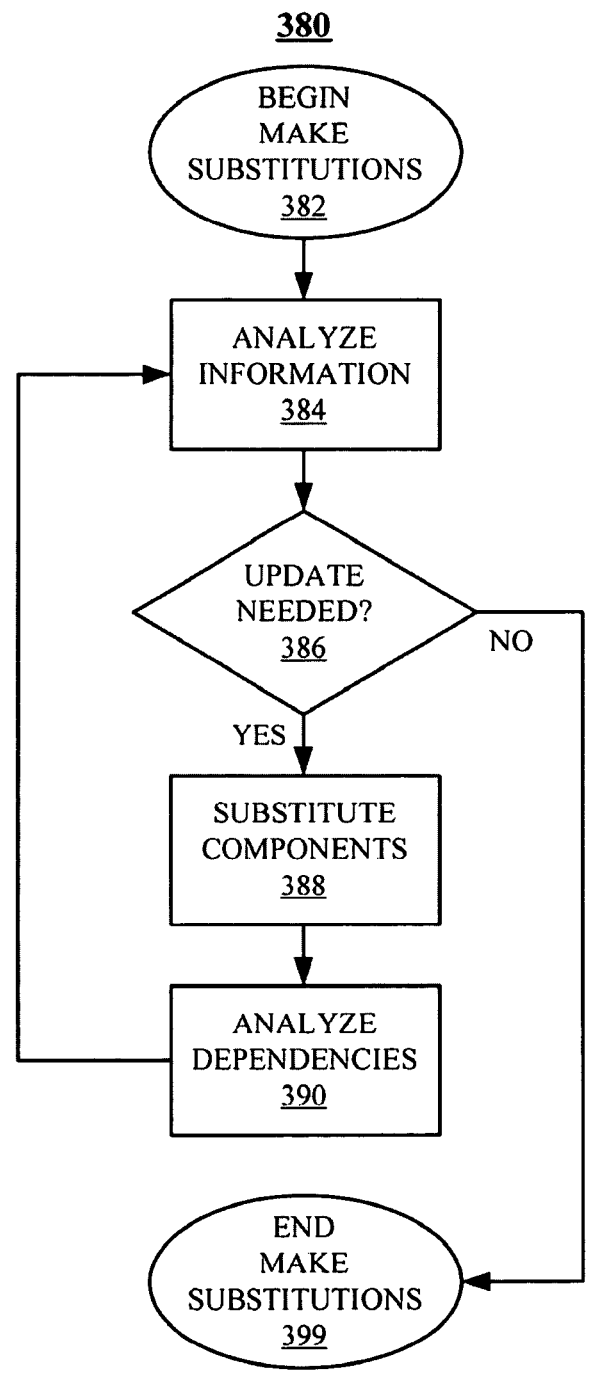
FIG. 6 is a flowchart of Modify Architecture process that implements one aspect of the Execute SMAUS, introduced in FIG. 5.

FIG. 6 is a flowchart of a Make Substitutions process 380 that implements one aspect of Execute SMAUS process 350, introduced in FIG. 5. Process 380 corresponds to Make Substitutions block 360 (FIG. 5) of process 350. As part of process 350, process 380 is also stored in data storage 112 (FIG. 1) and executed on CPU 104 (FIG. 1) of client system 102 (FIG. 1).

Process 380 starts in a "Begin Make Substitutions" block 382 and proceeds immediately to an "Analyze Information" block 382. During block 382, process 380 analyzes the information retrieved during blocks 354 and 356 of process 350, described above in conjunction with FIG. 5. Factors analyzed include, but are not limited to, superseded version numbers or entirely different components that have been substituted for others in system metadata repository 244, SBB metadata repository 245 and/or solution repository 210.

During a "Substitute components" block 386, the architecture design stored in solution repository 230 is modified to reflect the updated component or components. During an "Analyze Dependencies" block 390, process 380 determines if substitutions implemented during block 386 have created a need to modify additional components. As described above, metadata repositories 244 and 245 include information on dependencies among components. For example, process 380 may determine that a substitution of SBB_211 (FIG. 2) with SBB_4 311 (FIG. 4) requires that associated hardware HW_1 214 (FIG. 2) must be replaced with HW_4 314 (FIG. 4).

During an "Update Needed?" block 392, process 380 determines based upon the analysis executed during block 390 whether or not the component substitutions implemented during block 386 have created dependencies in other components that need to be addressed. If additional component substitutions are required, process 380 returns to block 386 during which the substitutions are implemented and processing continues as described above. If, during block 392, process 380 determines that additional substitutions are not required, control proceeds to an "End Modify Architecture" block 399 in which process 380 is complete.

While the claimed subject matter has been shown and described with reference to particular embodiments thereof, it will be understood by those skilled in the art that the foregoing and other changes in form and detail may be made therein without departing from the spirit and scope of the claimed subject matter, including but not limited to additional, less or modified elements and/or additional, less or modified blocks performed in the same or a different order.

We claim:

1. A method, comprising:
   detecting a modification to a component architecture;
   analyzing whether or not the modified component architecture necessitates a change to a solution architecture;
   if the analysis determines the need to change the solution architecture, identifying a replacement component for a component represented in the solution architecture to implement the change in the solution architecture:
   replacing, in the solution architecture, the component represented in the solution architecture with the replacement component; and, in response to the replacing,
   automatically updating a solution architecture model to reflect the replacement of the component with the replacement component.

2. The method of claim 1, further comprising:
   detecting a dependency of the replacement component;
   replacing a second component represented in the solution architecture with a second replacement component to resolve the dependency; and
   updating the solution architecture model to reflect the replacement of the second component with the second replacement component.

3. The method of claim 1, wherein the component represented in the solution architecture and the replacement component each include software elements.

4. The method of claim 1, wherein the component represented in the solution architecture and the replacement component each include hardware elements.

5. The method of claim 1, wherein the component represented in the solution architecture and the replacement components are solution building block (SBB) components.

6. The method of claim 1, further comprising updating associated tooling, employed in the creation of the solution architecture, with respect to the updating of the solution architecture model.

7. The method of claim 6, wherein the associated tooling is an IBM® Solution Assembly Toolkit.

8. A system, comprising:
   a processor;
   a memory coupled to the processor; and
   logic, stored on the memory and executed on the processor, for:

detecting a modification to a component architecture;
analyzing whether or not the modified component architecture necessitates a change to a solution architecture;
identifying a replacement component for a component represented in the solution architecture to implement the change in the solution architecture;
replacing, in the solution architecture, the component represented in the solution architecture with the replacement component; and, in response to the replacing,
automatically updating a solution architecture model to reflect the replacement of the component with the replacement component.

9. The system of claim 8, further comprising logic, stored on the memory and executed on the processor, for:
detecting a dependency of the replacement component;
replacing a second component represented in the solution architecture with a second replacement component to resolve the dependency; and
updating the solution architecture model to reflect the replacement of the second component with the second replacement component.

10. The system of claim 8, wherein the component represented in the solution architecture and the replacement component comprise software elements.

11. The system of claim 8, wherein the component represented in the solution architecture and the replacement component comprise hardware elements.

12. The system of claim 8, wherein the component represented in the solution architecture and the replacement components are solution building block (SBB) components.

13. The system of claim 8, further comprising logic, stored on the memory and executed on the processor, for updating associated tooling, employed in the creation of the solution architecture, with respect to the updating of the solution architecture model.

14. The system of claim 13, wherein the associated, tooling is an IBM® Solution Assembly Toolkit.

15. A computer programming product, comprising:
a memory; and
logic, stored on the memory for execution on a processor, for:
detecting a modification to a component architecture;
analyzing whether or not the modified component architecture necessitates to change to a solution architecture;
identifying a replacement component for a component represented in the solution architecture to implement the change solution architecture;
replacing, in the solution architecture, the component represented in the solution architecture with the replacement component; and, in response to the replacing,
automatically updating a solution architecture model to reflect the replacement of the component represented the replacement component.

16. The computer programming product of claim 15, further comprising logic, stored on the memory for execution on the processor, for:
detecting a dependency of the replacement component;
replacing an second component represented in the solution architecture with a second replacement component to resolve the dependency; and
updating the solution architecture model to reflect the replacement of the second component with the second replacement component.

17. The computer programming product of claim 15, wherein the component represented in the solution architecture and the replacement component each include software elements.

18. The computer programming product of claim 15, wherein the component represented in the solution architecture and the replacement component each include hardware elements.

19. The computer programming product of claim 15, wherein the component represented in the solution architecture and the replacement components are solution building block (SBB) components.

20. The computer programming product of claim 15, further comprising logic, stored on the memory for execution on the processor, for updating associated tooling, employed in the creation of the solution architecture, with respect to the updating of the solution architecture model.

* * * * *